United States Patent [19]

Adachi et al.

[11] Patent Number: 4,750,786

[45] Date of Patent: Jun. 14, 1988

[54] BRAKE PRESSURE CONTROL SYSTEM OF VEHICLE LOAD RESPONSIVE TYPE

[75] Inventors: Yoshiharu Adachi, Gamagori; Takashi Nagashima, Aichi; Kiyonobu Nagamori, Toyota; Masuo Yamashita, Toyota; Harumi Ohori, Toyota; Ryuichi Sakakibara, Toyota, all of Japan

[73] Assignees: Aisin Seiki Kabushiki Kaisha; Toyota Jidosha Kabushiki Kaisha, both of Toyota, Japan

[21] Appl. No.: 46,287

[22] Filed: May 6, 1987

[30] Foreign Application Priority Data

May 10, 1986 [JP] Japan .............................. 61-70552[U]

[51] Int. Cl.⁴ .............................. B60T 8/18; F16F 1/12
[52] U.S. Cl. .................................. 303/22.1; 303/22.8; 303/56; 188/195; 267/179
[58] Field of Search ...................... 188/195; 248/624; 267/174, 175, 177, 179; 303/56, 22 R, 23 R, 23 A; 403/225, 229, DIG. 8

[56] References Cited

U.S. PATENT DOCUMENTS 3,362,758  1/1963  Goerke et al. ................... 303/22 R
3,506,313  4/1970  Lawson .............................. 188/195
4,058,347  11/1977 Reinecke .......................... 303/22 R Primary Examiner—Andres Kashnikow
Assistant Examiner—Timothy Newholm
Attorney, Agent, or Firm—Oblon, Fisher, Spivak, McClelland & Maier

[57] ABSTRACT

A brake pressure control system for a wheeled vehicle includes a swingable lever pivotally mounted at a first end portion thereof to a sprung mass of the vehicle such as a body frame, a first tension coil spring connected at a first end thereof to the sprung mass and at a second end thereof to a second end portion of the swingable lever to bias the lever toward the sprung mass, a second tension coil spring connected at a first end thereof to an unsprung mass of the vehicle such as a wheel axle and at a second end thereof to the second end portion of the swingable lever to bias the lever against the biasing force of the first spring, a bushing rotatably mounted on the second end portion of the swingable lever, the bushing being formed with a first support portion for retaining the second end of the first spring and a second support portion for retaining the second end of the second spring, and a modulator valve secured to the sprung mass and incorporated in a hydraulic connection between a master cylinder and a wheel brake cylinder, the modulator valve having a spring-loaded valve member which is carried on the swingable lever to be applied with a biasing force proportional to the vehicle load.

5 Claims, 2 Drawing Sheets

BRAKE PRESSURE CONTROL SYSTEM OF VEHICLE LOAD RESPONSIVE TYPE

BACKGROUND OF THE INVENTION

1. Field of the Invention

The present invention relates to a hydraulic brake pressure control system of the load responsive type for wheeled vehicles, and more particularly to a hydraulic brake pressure control system of the type which is arranged to control the rate of increase of the wheel brake cylinder pressure less than that of the master cylinder pressure in proportion to the vehicle load.

2. Description of the Prior Art

In Japanese Patent Publication No. 46-39963, there has been proposed a hydraulic brake pressure control system of the type which includes a modulator valve mounted on an unsprung mass of a vehicle, the modulator valve having a spring-loaded valve member carried on a load sensing mechansim. The load sensing mechanism comprises a swingable lever pivotally mounted at its intermediate portion to the housing of the modulator valve to bear the valve member thereon, a first tension coil spring connected at its upper end to an upper portion of the valve housing and at its lower end to a first end of the swingable lever to bias the lever upward, a second tension coil spring connected at its lower end to a second end of the swingable lever and at its upper end to a sprung mass of the vehicle to bias the lever against the biasing force of the first tension coil spring.

In such a control system as described above, the first tension coil spring acts to define a hydraulic pressure applied to the wheel brake cylinders under control of the modulator valve when subjected to deceleration of the vehicle in excess of a predetermined value in a maximum loaded condition, while the second tension coil spring acts to control the hydraulic pressure in dependence upon the vehicle load. If in the control system the second tension coil spring was disconnected by a rebound stone, the entire biasing force of the first tension coil spring would be applied to the spring-loaded valve member in the modulator valve assembly. This results in an unexpected increase of the hydraulic pressure applied to the wheel brake cylinders when subjected to the deceleration of the vehicle in excess of the predetermined value in the maximum loaded condition. As a result, the road wheels of the vehicle tend to be locked in an unloaded condition or light loaded condition of the vehicle.

SUMMARY OF THE INVENTION

It is, therefore, a primary object of the present invention to solve the problem in such a conventional load sensing mechanism as described above.

According to the present invention, the primary object is attained by providing a hydraulic brake pressure control system for a wheeled vehicle, which system comprises a swingable lever pivotally mounted at a first end portion thereof to one of sprung and unsprung masses of the vehicle, a first tension spring connected at a first end thereof to the one of the sprung and unsprung masses and at a second end thereof to a second end portion of the swingable lever to bias the lever toward the one of the sprung and unsprung masses, a second tension spring connected at a first end thereof to the other mass of the vehicle and at a second end thereof to the second end portion of the swingable lever to bias the lever against the biasing force of the first tension spring, a bushing rotatably mounted on the second end portion of the swingable lever, the bushing being formed with a first support portion for retaining the second end of the first tension spring and a second support portion for retaining the second end of the second tension spring, wherein the first support portion has a cross-section formed to cause rotation of the bushing under the biasing force of the first spring for decreasing the biasing force of the first tension spring and the second support portion has a cross-section formed to restrict the rotation of the bushing under the biasing force of the second tension spring, and a modulator valve secured to the one of the sprung and unsprung masses and being incorporated in a hydraulic connection between a master cylinder and a wheel brake cylinder, the modulator valve having a spring-loaded valve member which is carried on an intermediate portion of the swingable lever to be applied with a biasing force proportional to the vehicle load.

BRIEF DESCRIPTION OF THE DRAWINGS

Additional objects, features and advantages of the present invention will be readily appreciated from the following detailed description of a preferred embodiment thereof when considered with reference to the accompanying drawings, in which.

DESCRIPTION OF THE PREFEERED EMBODIMENT

Figure 1:
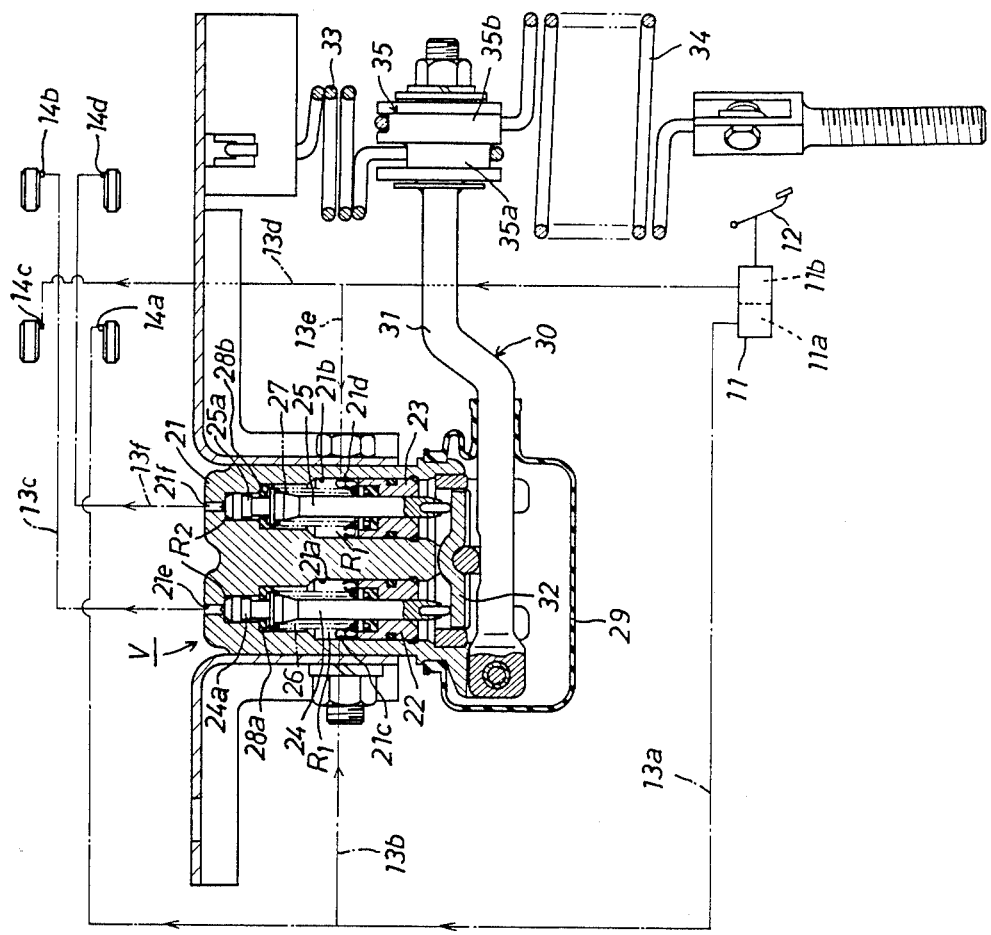
FIG. 1 is a sectional view of a modulator valve assembly of the load responsive type carried on a load sensing mechanism in accordance with the present invention.

Referring now to the drawings, FIG. 1 illustrates a hydraulic brake pressure control system of the load responsive type in accordance with the present invention, which system includes a modulator valve V of the load responsive type incorporated within dual hydraulic connections between a tandem master cylinder 11 and rear-wheel brake cylinders 14b, 14d for controlling the rate of increase of the wheel brake cylinder pressure at a level less than that of the master cylinder pressure in proportion to the vehicle load. The tandem master cylinder 11 is arranged to be operated by depression of a brake pedal 12 and has first and second pressure chambers 11a and 11b, the first pressure chamber 11a being connected to a left-hand front-wheel brake cylinder 14a by way of a conduit 13a and to the right-hand rear-wheel brake cylinder 14b by way of a branch conduit 13b bifrucated from conduit 13a, the modulator valve V and a conduit 13c, while the second pressure chamber 11b being connected to a right-hand front-wheel brake cylinder 14c by way of a conduit 13d and to the left-hand rear-wheel brake cylinder 14d by way of a branch conduit 13e bifrucated from conduit 13d, the modulator valve V and a conduit 13f.

The modulator valve V comprises a housing 21, a pair of sleeves 22, 23, a pair of differential pistons 24, 25, and a pair of compression coil springs 26, 27. The differential pistons 24 and 25 are carried on a load sensing mechanism 30 to be displaced in dependence upon the vehicle load. The housing 21 is rigidly secured to a mounting bracket B fastened to a sprung mass of the vehicle such as a body frame part, which housing 21 is formed therein with a pair of parallel stepped bores 21a, 21b, inlet ports 21c, 21d each in connection to the branch conduits 13b, 13e and in open communication with the stepped bores 21a, 21b, and outlet ports 21e, 21f each in connection to the conduits 13c, 13f and in open communication with the stepped bores 21a, 21b. The sleeves 22, 23 are fixedly coupled within each open end portion of the stepped bores 21a, 21b in a fluid-tight manner to axially slidably support the pistons 24, 25 and to receive each lower end of the compression coil springs 26, 27 thereon.

The pistons 24, 25 are formed respectively at their upper ends with valve parts 24a, 25a which cooperate with annular valve seats 28a, 28b secured to each annular shoulder of stepped bores 21a, 21b. In a condition where the pistons 24, 25 are in abutment with the respective upper ends of stepped bores 21a, 21b at their upper ends under the load of springs 26, 27 and load sensing mechanism 30, the valve parts 24a, 25a of pistons 24, 25 are spaced respectively from the valve seats 28a, 28b to permit the flow of fluid under pressure between first and second pressure chambers $R_1$ and $R_2$ each in open communication with the inlet ports 21c, 21d and with the outlet ports 21e, 21f. When the pistons 24, 25 are displaced downward against the load of springs 26, 27 and load sensing mechanism 30, the valve parts 24a, 25a of pistons 24, 25 are brought into engagment with the valve seats 28a, 28b respectively to interrupt the flow of fluid under pressure between the pressure chambers $R_1$ and $R_2$.

The load sensing mechanism 30 includes a swingable lever 31, an equalizer 32 and a pair of tension coil springs 33, 34. The swingable lever 31 is pivotally mounted at its front end to a lower portion of housing 21 to be moved toward and away from the pistons 24, 25 in a vertical plane. The swingable lever 31 extends outwardly through a boot 29 fixedly coupled with the low end portion of housing 21 and is carried at its rear end portion by means of the tension coil springs 33, 34 to resiliently support thereon the lower ends of pistons 24, 25 through the equalizer 32 under the load of tension coil springs 33, 34 acting thereon. The tension coil spring 33 is suspended from a mounting bracket to bias the pistons 24, 25 upward in such a manner as to define a hydraulic pressure applied to the rear-wheel brake cylinders 14b, 14d under control of the modulator valve V when subjected to deceleration of the vehicle in excess of a predetermined value in a maximum loaded condition. The tension coil spring 34 is connected at its lower end to an unsprung mass of the vehicle such as a wheel axle to adjust the upward biasing force of spring 33 in dependence upon the vehicle load. In this embodiment, the biasing force of lower tension coil spring 34 is determined smaller than that of upper tension coil spring 33.

Figure 4:
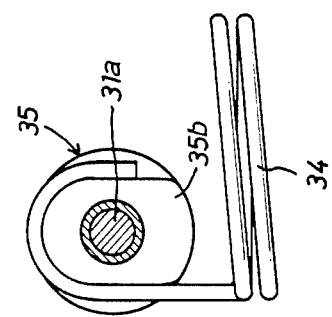
FIG. 4.is a cross-sectional view taken along the line IV—IV in FIG. 2.
Figure 3:
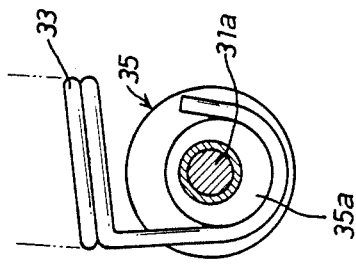
FIG. 3 is a cross-sectional view taken along the line III—III in FIG. 2.
Figure 2:
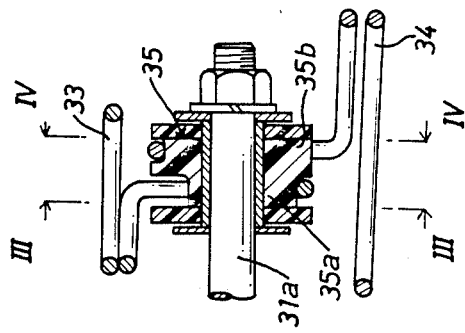
FIG. 2 is a cross-sectional view of a bushing mounted on the rear end portion of a swingable lever shown in FIG. 1.

As shown in FIGS. 2 to 4, a bushing 35 is rotatably mounted on the rear end portion 31a of swingable lever 31 and positioned in place for engagement with the lower end of spring 33 and with the upper end of spring 34. The bushing 35 is formed with a first support portion 35a for retaining the lower end of spring 33 and formed with a second support portion 35b for retaining the upper end of spring 34. As shown clearly in FIGS. 2 and 3, the first support portion 35a of bushing 35 has a circular cross-section the center of which is eccentrically displaced downward with respect to the central axis of the rear end portion 31a of swingable lever 31. When maintained in engagement with the lower end of spring 33, the first support portion 35a is arranged to be rotated through approximately 180° about the rear end portion 31a of swingable lever 31 under the upward biasing force of spring 33. As shown clearly in FIGS. 2 and 4, the second support portion 35b is in the form of an ellipsoidal piece formed with a pair of parallel side faces. When maintained in engagement with the upper end of spring 34, the second support portion 35b of bushing 35 is arranged to restrict the rotation of bushing 35 under the downward biasing force of spring 34.

In a normal condition where both the tension coil springs 33 and 34 are maintained in engagement with the bushing 35, the spring 33 cooperates with the spring 34 to regulate the upward biasing force acting on the pistons 24, 25 in modulator valve V in dependence upon change of the vehicle load.

Assuming that the master cylinder 11 is operated by depression of the brake pedal 12 to create a hydraulic braking pressure in its pressure chambers 11a and 11b, the braking pressure from chamber 11a is applied to the left-hand front-wheel brake cylinder 14a through conduit 13a and to the right-hand rear-wheel brake cylinder 14b through conduit 13b, respective pressure chambers $R_1$, $R_2$ in modulator valve V and conduit 13c, while the braking pressure from chamber 11b is applied to the right-hand front-wheel brake cylinder 14c through conduit 13d and to the left-hand rear-wheel brake cylinder 14d through conduit 13e, respective pressure chambers $R_1$, $R_2$ in modulator valve assembly V and conduit 13f. When the braking pressure inceases up to a predetermined value, the pistons 24, 25 are brought into engagement with the valve seats 24a, 25a to interrupt the fluid communication between the pressure chambers $R_1$ and $R_2$. In this embodiment, the predetermined value is defined by each pressure receiving area of pistons 24, 25, each biasing force of compression coil springs 26, 27, and each biasing force of springs 33, 34. When the respective pressures in chambers $R_1$ are further increased, the respective valve parts 24a, 25a of pistons 24, 25 are disengaged from the valve seats 28a, 28b to permit the fluid communication between the pressure chambers $R_1$ and $R_2$. Subsequently, such operation of the pistons 24, 25 in modulator valve V will be repeated in accordance with further increase of the braking pressure substantially in the same manner as that in a conventional modulator valve of this kind.

If the lower tension coil spring 34 is disconnected by a rebound stone, the rear end portion 31a of swingable lever 31 will be released from the load of spring 34 to permit rotation of the bushing 35. In this instance, the biasing force of upper tension spring 33 will cause the bushing 35 to rotate through 180° about the rear end portion 31 of swingable lever 31. As a result, the upper tension spring 33 is shortened to decrease the upward biasing force acting on swingable lever 31. In such a condition, the upward biasing forces acting on pistons 24, 25 decrease less than that in the maximum loaded condition of the vehicle to make the load responsive action of the modulator valve assembly V inoperative. Thus, the modulator valve V acts as a conventional proportioning valve to prevent the rear road wheels from locking in an unloaded condition or light loaded condition of the vehicle.

In a modification of the above-described embodiment, the load sensing mechanism 30 may be adapted to a modulator valve of the load responsive type provided therein with a single differential piston. Alternatively, the housing 21 and upper tension spring 33 may be mounted to the unsprung mass whereas the lower tension spring 34 may be mounted to the sprung mass. Furthermore, the first support portion 35a of bushing 35 may be modified in its cross-section to cause rotation of the bushing 35 about the rear end portion 31a of swingable lever 31, while the second support portion 35b of bushing 35 may be also modified to restrict the rotation of bushing 35 against the biasing force of upper tension spring 33.

Although the present invention has been illustrated and described in connection with a specific embodiment and certain modifications thereof, it is obvious that other various modifications thereof are possible. The invention, therefore, is not intended to be restricted to the exact showing of the drawings and description thereof, but is considered to include reasonable and obvious equivalents.

What is claimed is:

1. A hydraulic brake pressure control system for a wheeled vehicle having a master cylinder, a wheel brake cylinder, a sprung mass such as a body frame, and an unsprung mass such as a wheel axle, the control system comprising:

a swingable lever pivotally mounted at a first end portion thereof to one of said sprung and unsprung masses;

a first spring connected at a first end thereof to the one of said sprung and unsprung masses and at a second end thereof to a second end portion of said swingable lever to bias said lever toward the one of said sprung and unsprung masses;

a second spring connected at a first end thereof to the other mass and at a second end thereof to the second end portion of said swingable lever to bias said lever against the biasing force of said first spring;

a bushing rotatably mounted on the second end portion of said swingable lever, said bushing being formed with a first support portion for retaining the second end of said first spring and a second support portion for retaining the second end of said second spring, wherein said first support portion has a cross-section formed to cause rotation of said bushing under the biasing force of said first spring for decreasing the biasing force of said first spring acting on said swingable lever and said second support portion has a cross-section formed to restrict the rotation of said bushing under the biasing force of said second spring; and a modulator valve secured to the one of said sprung and unsprung masses and being incorporated in a hydraulic connection between said master cylinder and said wheel brake cylinder, said modulator valve having a spring-loaded valve member which is carried on an intermediate portion of said swingable lever to be applied with a biasing force proportional to the vehicle load.

2. A hydraulic brake pressure control system as recited in claim 1, wherein said swingable lever is pivotally mounted at the first end portion thereof to said sprung mass, said first spring is connected at the first end thereof to said sprung mass to bias said swingable lever toward said sprung mass, and said second spring is connected at the first end thereof to said unsprung mass to bias said swingable lever toward said unsprung mass against the biasing force of said first spring.

3. A hydraulic brake pressure control system as recited in claim 1, wherein said swingable lever is pivotally mounted at the first end portion thereof to said sprung mass, said first spring is a tension coil spring connected at an upper end thereof to said sprung mass and at a lower end thereof to the first support portion of said bushing, and said second spring is a tension coil spring connected at a lower end thereof to said unsprung mass and at an upper end thereof to the second support portion of said bushing.

4. A hydraulic brake pressure control system as recited in claim 3, wherein said modulator valve is secured to a mounting bracket fastened to said sprung mass, said swingable lever is pivotally mounted at the first end portion thereof to a housing of said modulator valve, and said first tension coil spring is connected at the upper end thereof to said mounting bracket.

5. A hydraulic brake pressure control system as recited in claim 1, wherein the first support portion of said bushing has a circular cross-section the center of which is eccentrically displaced with respect to the centeral axis of the second end portion of said swingable lever, and the second support portion of said bushing is in the form of an ellipsoidal piece formed with a pair of parallel side faces for engagement with the second end of said second spring.

* * * * *